United States Patent
Kuroi

(10) Patent No.: US 6,535,292 B1
(45) Date of Patent: Mar. 18, 2003

(54) DATA PROCESSING APPARATUS CAPABLE OF COMMUNICATING WITH OUTPUT APPARATUS AND ITS DATA PROCESSING METHOD

(75) Inventor: Yoshinobu Kuroi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/208,976

(22) Filed: Dec. 11, 1998

(30) Foreign Application Priority Data

Dec. 16, 1997 (JP) .............................. 9-346316

(51) Int. Cl.⁷ .............................. G06F 15/00
(52) U.S. Cl. ............... 358/1.11; 358/437; 358/444; 358/448; 382/239
(58) Field of Search .................. 358/1.1, 1.15, 358/1.16, 1.14, 1.17, 1.9, 437, 444, 448, 442, 471, 468, 404; 714/47; 702/186; 705/400; 382/239

(56) References Cited

U.S. PATENT DOCUMENTS 5,337,258 A * 8/1994 Dennis ..................... 714/47
5,832,126 A * 11/1998 Tanaka ..................... 382/239

OTHER PUBLICATIONS

U.S. patent application Ser. No. 09/124,019, filed Jul. 29, 1998.

U.S. patent application Ser. No. 09/244,475, filed Feb. 4, 1999.

* cited by examiner

Primary Examiner—Mark Wallerson
Assistant Examiner—Twyler Lamb
(74) Attorney, Agent, or Firm—Fitzpatrick, Cella, Harper & Scinto

(57) ABSTRACT

A data processing apparatus which communicates with a printer forms trial compressions of image data to discriminate whether sufficient compression has been obtained. A print image is produced by analysis of a drawing command, and a print control command is formed based on the print image. Image data is compressed in a predetermined segment by applying a specific compression method so as to obtain size information. Based on the size information, a discrimination is made as to whether the specific compression method is to be applied to the image data. This discrimination is made repeatedly for each predetermined segment. A print control command is formed if the size information indicates that the size of the compressed data is smaller than a threshold, whereas the print control command is not formed if the size of the compressed data is not.

13 Claims, 8 Drawing Sheets

FIG. 7

| MEM SIZE | $\gamma 1$ [msec/byte] | $\gamma 2$ [msec/byte] |
|---|---|---|
| 4 (MB) | 0.230 | 0.125 |
| 8 (MB) | 0.210 | 0.120 |
| 12 (MB) | 0.190 | 0.115 |
| 16 (MB) | 0.170 | 0.110 |
| 20 (MB) | 0.150 | 0.105 |
| 28 (MB) | 0.130 | 0.100 |

FIG. 9

MEM MAP OF MEM MEDIUM
(FD/CD-ROM)

| DIRECTORY |
|---|
| FIRST DATA PROCESSING PROGRAM<br>PROGRAM CODES FOR STEPS OF FIG. 4 |
| SECOND DATA PROCESSING PROGRAM<br>PROGRAM CODES FOR STEPS OF FIG. 5 |
| THIRD DATA PROCESSING PROGRAM<br>PROGRAM CODES FOR STEPS OF FIG. 6 |
| FOURTH DATA PROCESSING PROGRAM<br>PROGRAM CODES FOR STEPS OF FIG. 8 |
| |

DATA PROCESSING APPARATUS CAPABLE OF COMMUNICATING WITH OUTPUT APPARATUS AND ITS DATA PROCESSING METHOD

BACKGROUND OF THE INVENTION

1. Field of the Invention

The invention relates to a data processing apparatus which can communicate with a printer through a predetermined communication medium, a data processing method of the data processing apparatus, and a memory medium in which a computer readable program has been stored.

2. Related Background Art

Hitherto, in a printing system comprising a host computer and a printer connected to the host computer, a conventional printer driver (printer control command forming program) which operates on the host computer forms a printer control command while always applying a predetermined data compression method. In the case where a data compressing process cannot be performed due to some reasons or a compression effect cannot be obtained, another compression method in place of it is applied or a printer control command forming process which is not accompanied with the data compressing process is executed.

In the printer driver according to the conventional technique, since a processing time that is required for various printing processes is not considered in a step of forming the printer control command while applying a specific compression method, there is a problem such that a relatively high-speed printing process cannot be performed.

SUMMARY OF THE INVENTION

The invention is made to solve the above problems and it is an object of the invention to provide a data processing apparatus in which feature information which makes it possible to presume various print processing times in the case where a specific compression method is applied and the case where it is not applied is obtained, printer control commands are sequentially formed while a compression method whereby a relatively high-speed process can be performed is dynamically determined on the basis of the feature information, thereby enabling a relatively high-speed printing process to be realized. It is also an object of the invention to provide a data processing method for such a data processing apparatus and a memory medium in which a computer readable program has been stored.

According to a first aspect of the present invention, there is provided a data processing apparatus which can communicate with a printer through a predetermined communication medium, comprising: printer command forming means for constructing a print image by analyzing a drawing command which is formed by an operating system and for forming a printer control command which is based on the print image and should be transferred to the printer; first obtaining means for obtaining feature information to presume print processing times by the printer command forming means in the case where a specific compression method is used and the case where it is not used; discriminating means for discriminating whether the printer command forming means should use the specific compression method or not on the basis of the feature information obtained by the first obtaining means; and control means for switching and controlling the formation of the printer control command which is formed by the printer command forming means and to which the specific compression method is applied and the formation of the printer control command to which the specific compression method is not applied on the basis of a discrimination result of the discriminating means.

According to a second aspect of the invention, the discriminating means compares the processing times which are computed from the feature information obtained by the first obtaining means and from a predetermined parameter, thereby discriminating whether the printer command forming means can apply the use of the specific compression method or not.

According to a third aspect of the invention, the discriminating means discriminates whether the specific compression method should be used after the print image was constructed or not.

According to a fourth aspect of the invention, the first obtaining means obtains the feature information to presume the print processing time from a predetermined memory medium.

According to a fifth aspect of the invention, the predetermined memory medium is a memory medium which is detachable to/from a main body of the data processing apparatus.

According to a sixth aspect of the invention, the first obtaining means obtains the feature information to presume the print processing time from a value that is inputted on a predetermined print setting picture plane depending on a print control module.

According to a seventh aspect of the invention, the first obtaining means obtains the feature information to presume the print processing time by a predetermined program module.

According to an eighth aspect of the invention, the first obtaining means obtains the feature information to presume the print processing time from a memory resource of the printer through the communication medium.

According to a ninth aspect of the invention, the first obtaining means obtains the feature information to presume the print processing time from a memory resource which is detachable to/from the printer through the communication medium.

According to a tenth aspect of the invention, the data processing apparatus further has: second obtaining means for obtaining print resource information from the printer through the communication medium; and changing means for changing the feature information to presume the print processing time obtained by the first obtaining means on the basis of the print resource information obtained by the second obtaining means.

According to an eleventh aspect of the present invention, there is provided a data processing method of a data processing apparatus which can communicate with a printer through a predetermined communication medium, comprising: a printer command forming step of constructing a print image by analyzing a drawing command which is formed by an operating system and forming a printer control command which is based on the print image and should be transferred to the printer; an obtaining step of obtaining feature information to presume print processing times by the printer command forming step in the case where a specific compression method is used and the case where it is not used; a discriminating step of discriminating whether the specific compression method should be used in the printer command forming step or not on the basis of the feature information obtained by the obtaining step; and a deciding step of deciding the formation of the printer control command which is formed by the printer command forming step and to which the specific compression method is applied and the formation of the printer control command to which the specific compression method is not applied on the basis of a discrimination result of the discriminating step.

According to a twelfth aspect of the present invention, there is provided a memory medium in which a computer readable program for controlling a data processing apparatus which can communicate with a printer through a predetermined communication medium has been stored, wherein said program comprises: a printer command forming step of constructing a print image by analyzing a drawing command which is formed by an operating system and forming a printer control command which is based on the print image and should be transferred to the printer; an obtaining step of obtaining feature information to presume print processing times by the printer command forming step in the case where a specific compression method is used and the case where it is not used; a discriminating step of discriminating whether the specific compression method should be used in the printer command forming step or not on the basis of the feature information obtained by the obtaining step; and a deciding step of deciding the formation of the printer control command which is formed by the printer command forming step and to which the specific compression method is applied and the formation of the printer control command to which the specific compression method is not applied on the basis of a discrimination result of the discriminating step.

According to the invention, there are provided data processing method and apparatus, in which a CPU 1 obtains the feature information to presume various print processing times in the case where the specific compression method is applied and the case where it is not applied is obtained from any one of an RAM 2, an external memory 11, an external memory 14, and an ROM 13, and the printer control commands are sequentially formed while the compression method by which a relatively high-speed process can be performed is dynamically determined on the basis of the feature information.

According to the data processing method of the invention, the method comprises: a printer command forming step of constructing a print image by analyzing a drawing command which is formed by an operating system and forming a printer control command which is based on the print image and should be transferred to the printer; an obtaining step of obtaining feature information to presume print processing times by the printer command forming step in the case where a specific compression method is used and the case where it is not used; a discriminating step of discriminating whether the specific compression method should be used in the printer command forming step or not on the basis of the feature information obtained by the first obtaining step; and a deciding step of deciding the formation of the printer control command which is formed by the printer command forming step and to which the specific compression method is applied and the formation of the printer control command to which the specific compression method is not applied on the basis of a discrimination result of the discriminating step. Therefore, whether the compression method is applied to a print data amount which fluctuates or not can be dynamically determined in consideration of the feature information to presume the print processing time by the printer command forming step. For print data such that the presumed processing time is below the effect that will be obtained by the compression, the printer control command which is based on the print image and should be transferred to the printer is formed without actively compressing, and a series of printing processes can be remarkably reduced.

Therefore, the feature information for making it possible to presume the various print processing times in the case where the specific compression method is applied and the case where it is not applied is obtained and the printer control commands can be sequentially formed while the compression method by which the relatively high-speed process can be performed is dynamically determined on the basis of the feature information. There are effects such that the relatively high-speed printing process can be realized and the like.

BRIEF DESCRIPTION OF THE DRAWINGS

FIG. 7 is a diagram showing an example of a feature information resource table which is assured in the RAM shown in FIG. 1;

FIG. 9 is a diagram for explaining a memory map of a memory medium to store various data processing programs which can be read out by the printing system to which the print control apparatus according to the invention can be applied.

DETAILED DESCRIPTION OF THE PREFERRED EMBODIMENTS

[First Embodiment]

Figure 1:
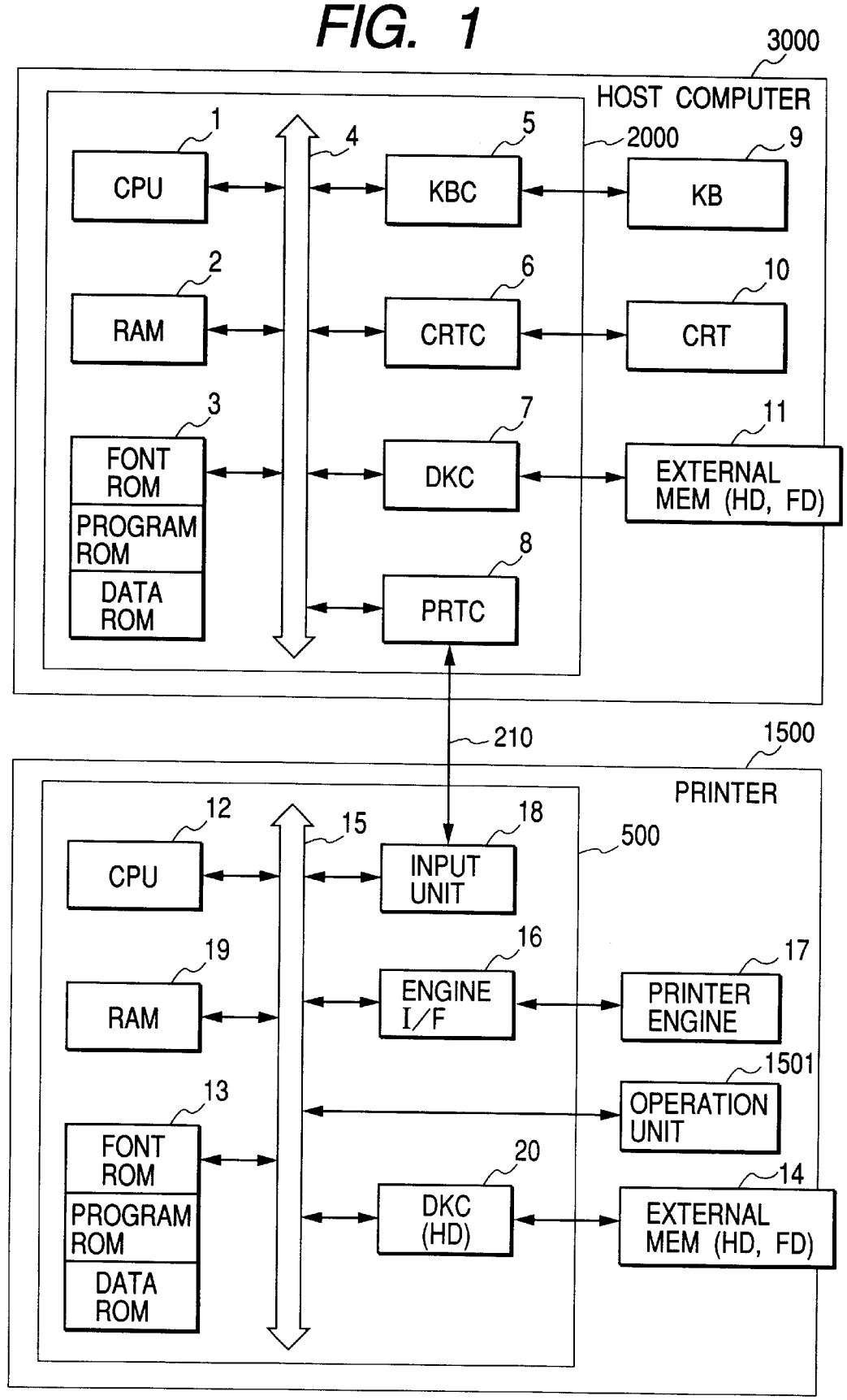
FIG. 1 is a block diagram for explaining a construction of a printing system to which a print control apparatus showing the first embodiment of the invention can be applied.

FIG. 1 is a block diagram for explaining a construction of a printing system to which a data processing apparatus showing the first embodiment of the invention can be applied. It will be obviously understood that the invention can be applied to any one of a single equipment, a system comprising a plurality of equipment, and a system which is connected through a network such as LAN, WAN, or the like and in which processes are executed so long as the functions of the invention are executed.

In the diagram, reference numeral 3000 denotes a host computer having a CPU 1 for executing a document process of a document in which figures, images, characters, tables (including a spreadsheet or the like), and the like mixedly exist on the basis of a document processing program or the like stored in a program ROM of an ROM 3. The CPU 1 collectively controls devices which are connected to a system bus 4.

An operating system program (hereinafter, abbreviated to an OS) serving as a control program or the like of the CPU 1 is stored in the program ROM of the ROM 3 or in an external memory 11. Font data or the like which is used at the time of the document process is stored in a font ROM of the ROM 3 or the external memory 11. Various data (for example, directory information, printer driver table, and the like) which is used when performing the document process and the like is stored in a data ROM of the ROM 3 or the external memory 11. In this case, on hardware, a main part of the control is performed by the CPU.

On the other hand, on software, a main part of the control is performed by application software called a printer control command forming program (hereinafter, referred to as a printer driver). In the embodiment, for example, although "Windows 95" (trade name) is presumed as an OS, the invention is not limited to it.

Reference numeral 2 denotes an RAM which functions as a main memory, a work area, or the like of the CPU 1. Reference numeral 5 denotes a keyboard controller (KBC) for controlling a key input from a keyboard (KB) 9 or a pointing device (not shown). Reference numeral 6 denotes a CRT controller (CRTC) for controlling the display of a CRT display (CRT) 10. Reference numeral 7 denotes a disk controller (DKC) for controlling an access to the external memory 11 such as hard disk (HD), floppy disk (FD), or the like for storing a boot program, various applications, font data, a user file, an editing file, a printer driver, and the like.

Reference numeral 8 denotes a printer controller (PRTC) which is connected to a printer 1500 through a predetermined bidirectional interface (interface) 210 and executes a communication control process with the printer 1500. The CPU 1 executes, for example, a developing (rasterizing) process of an outline font into a display information RAM set on the RAM 2, thereby enabling WYSIWYG on the CRT 10. The CPU 1 opens various registered windows and executes various data processes on the basis of commands instructed by a mouse cursor or the like (not shown) on the CRT 10.

In the printer 1500, reference numeral 12 denotes a printer CPU (CPU) for generating an image signal as output information to a printing section (printer engine) 17 connected to a system bus 15 on the basis of a control program or the like stored in a program ROM of an ROM 13 or a control program or the like stored in an external memory 14.

Figure 2:
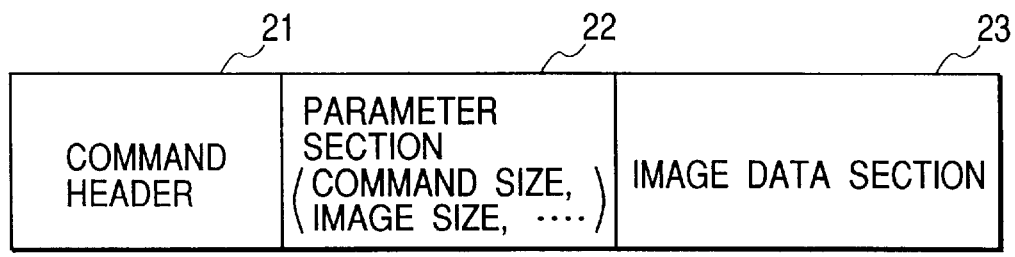
FIG. 2 is a diagram showing a format of a printer control command which is analyzed by a CPU shown in FIG. 1.

A control program or the like which can interpret a specific page describing language is stored in the program ROM of the ROM 13. Particularly, a printer control command (hereinafter, referred to as a raster image drawing command) having a drawing function of a raster image can be also processed. A format of the printer control command is constructed by a command header section 21, a parameter section 22, and an image data section 23 as shown in FIG. 2. A specific data compression method (hereinafter, referred to as a compression method A) can be also applied to the image data section 23.

Even if the same printer control command to which the compression method A is applied and the same printer control command to which the compression method A is not applied mixedly exist, the foregoing control command can be sequentially processed.

Further, font data which is used when the output information is formed is stored in a font ROM of the ROM 13 and, in case of a printer such that the external memory 14 such as a hard disk or the like does not exist, information or the like which is used on the host computer 3000 is stored in a data ROM of the ROM 13. The CPU 12 can communicate with the host computer 3000 through an input unit 18 and can notify the host computer 3000 of the information or the like in the printer 1500.

Reference numeral 19 denotes an RAM which functions as a main memory, a work area, or the like of the CPU 12. A memory size of the RAM 19 can be expanded by an option RAM which is connected to an expansion port (not shown).

The RAM 19 is used as an output information developing area, an environmental data storing area, an NVRAM, or the like. An access to the foregoing external memory 14 such as hard disk (HD), IC card, or the like is controlled by a disk controller (DKC) 20. The external memory 14 is connected as an option and stores font data, an emulation program, form data, and the like.

Reference numeral 500 denotes an operation panel (operation unit) on which switches for operation, an LED display, and the like are arranged.

Further, the foregoing external memory 14 is not limited to one memory but can be also constructed in a manner such that at least one or more memories are provided and a plurality of external memories in which an option font card besides built-in fonts and a program to interpret printer control languages of different language systems have been stored can be connected. Moreover, it is also possible to have an NVRAM (not shown) and to store printer mode setting information from the operation panel 500.

In the host computer 3000, the BIOS, OS, application, and a printer driver to which an information processing method according to the invention is applied are made operative by the CPU 1. The BIOS has been written in the program ROM of the ROM 3. The OS has been written in the hard disk (hereinafter, abbreviated to an HD) serving as an external memory 11. When a power source of the host computer 3000 is turned on, the OS is read out from the external memory 11 and is stored into the RAM 2 by an IPL (Initial Program Loading) function in the BIOS program and the operation of the OS is started.

The operation of the printer driver is actually enabled in the case where the application which operates under the OS management on the host computer 3000 starts the printing process by an instruction of the user or the like and in the case where the printer driver is read out from the medium such as an external memory 11 or the like in which the printer driver has been recorded and is loaded into the RAM 2 under the control of the OS and BIOS.

FIG. 2 is a diagram showing a format of a printer control command which is analyzed by the CPU 12 shown in FIG. 1. In the embodiment, it is constructed by the command header 21, parameter section 22 showing various parameters such as command size, image size, and the like, image data section 23, and the like.

Figure 3:
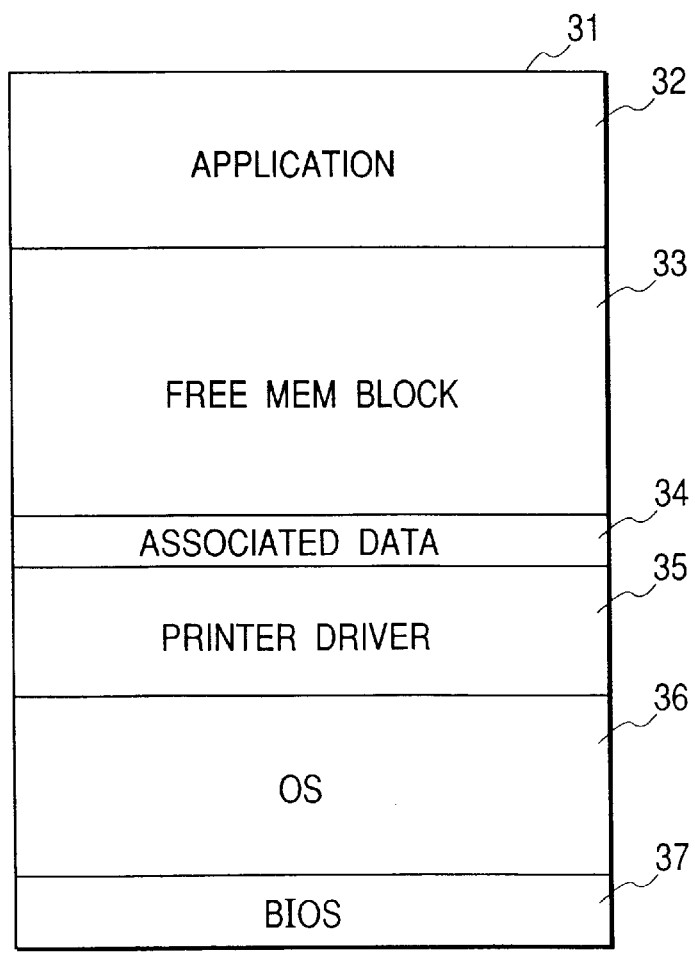
FIG. 3 is a diagram showing an example of a memory map in an RAM shown in FIG. 1.

FIG. 3 is a diagram showing an example of a memory map in the RAM 2 shown in FIG. 1 and corresponds to a memory map in a state where the printer driver has been loaded into the RAM 2 on the host computer 3000 and can be executed.

In the diagram, reference numeral 31 denotes the RAM 2 shown in FIG. 1; 32 a memory area which is used by the application; 33 a free memory block; 34 a memory area in which associated data is stored; 35 a memory area which is used by the printer driver; 36 an area which is used by the OS; and 37 a memory area which is used by the BIOS.

Figure 4:
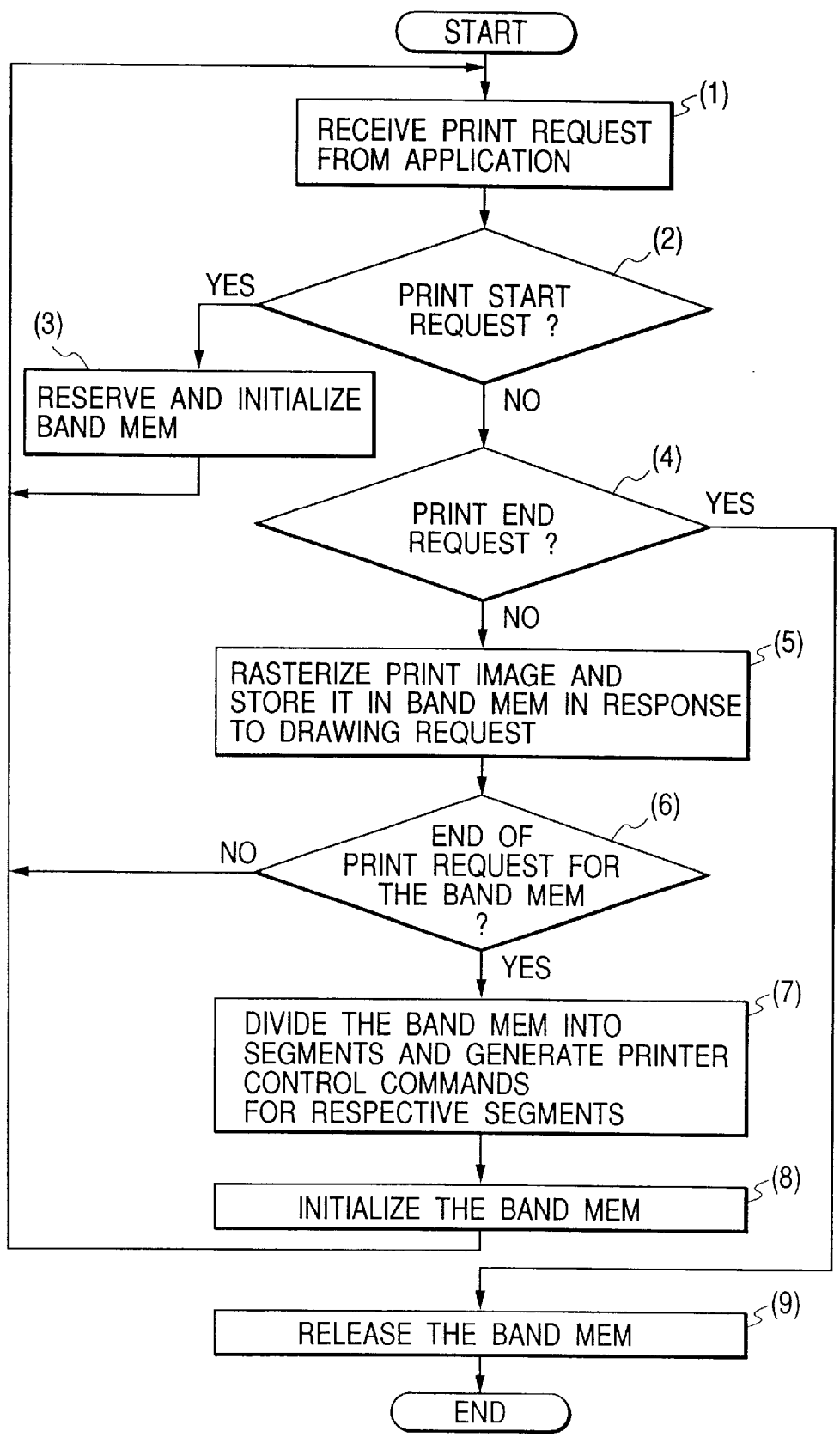
FIG. 4 is a flowchart showing an example of a first data processing procedure in the print control apparatus according to the invention.

In the embodiment, FIG. 4 is a flowchart showing a main flow when the raster system printer driver to which the invention can be applied forms a printer control command.

FIG. 4 is a flowchart showing an example of a first data processing procedure in the data processing apparatus according to the invention. Reference numerals (1) to (9) denote processing steps.

First, the printer driver receives a print request from the application (1). Subsequently, a check is made to see if the print request denotes the start of printing (2). If it is decided that it means the start of the printing, a memory area (hereinafter, referred to as a band memory) to store the rasterized print image is assured on the RAM 2 of the host computer 3000 and the initialization is performed in step (3). The printer driver again receives the print request from the application.

When it is determined in step (2) that the print request received from the application does not mean the start of the printing, a check is subsequently made to see if the print request denotes the end of printing in step (4). When it is determined that it does not indicate the end of the printing, in step (5), only when there is a drawing request, the print image according to the requested contents is constructed (rasterized) and stored into the band memory.

In step (6), a check is made to see if the print request from the application for the band area which is being processed has been finished. If NO, the processing routine is returned to step (1) and similar processes are repeated.

When it is decided in step (6) that the print request from the application has been finished, namely, when it is determined that the print request for the band area that is being processed has been finished, step (7) follows. The band area is divided into segments of a proper size and a printer control command corresponding to each of the segment areas is formed while dynamically applying the data compression as necessary.

In step (8), the band memory is subsequently initialized and the processing routine is returned to step (1) in order to again receive a print request corresponding to a new band area from the application.

When it is decided in step (4) that the print request received from the application indicates the end of the printing, step (9) follows and the band memory is released from the RAM 2. The processes are finished.

In the embodiment, the printing process in a range from the time point when the application which operates on the host computer 3000 starts the printing process to the time point when all of the output papers are ejected from the printer 1500 is largely classified into the following six phases. The processing time that is required by each printing process excluding phases 1, 2, and 6 largely depends on the compression method which is applied to the printer control command or its data size.

The first phase is a phase to form the print image on the host computer. The second phase is a phase to form the printer control command. The third phase is a phase of a spool (Write) and a phase of a despool (Read) of the printer control command. The fourth phase is a phase to transmit the printer control command. The fifth phase is a phase for developing the printer control command in the printer. The sixth phase is a phase to form the print image on the printer and convey the paper.

A flow of the first to sixth phase processes will now be described hereinbelow.

When the application which operates on the host computer 3000 starts the printing process by an instruction of the user or the like, the application generates various drawing commands to the printer driver through the OS in order to print and output the print image.

The printer driver stores the formed print image into the RAM 2 of the host computer 3000 in response to a series of various drawing commands while constructing the print image (the first phase). Subsequently to the first phase, the printer driver divides the print image stored in the RAM 2 into segments as necessary and forms a printer control command corresponding to each of the divided segments. When the printer control command is formed, the data is dynamically compressed as necessary (the second phase).

The printer control commands formed in the second phase are sequentially stored into the external memory 11 or the like as a temporary file which is managed by the OS and, after the series of printer control command forming processes was finished and all of the printer control commands were similarly stored, the printer control commands are read out from the temporary file under the OS management (the third phase).

The data read out by the third phase is transmitted to the printer 1500 under the OS control through connecting means which has previously been defined by the OS (the fourth phase).

When the printer control commands are received, the printer 1500 sequentially interprets them while collating with the specifications of the page describing languages which are supported by the control program stored in the ROM 13 or the like of the printer 1500 (the fifth phase).

Now, considering a page printer as an example, the print images formed by developing the printer control commands are successively stored into the RAM 19 of the printer 1500, the print image data is sequentially transmitted to the printing section (printer engine) 17 at a timing when the formation and the storage of the print image corresponding to the whole page are finished, the print image is printed onto an output paper by the printer engine 17, and after that, the printed paper is ejected from a printer paper ejecting section (the sixth phase).

The foregoing phases are not always time sequentially processed in accordance with a predetermined order. Most of the phases are usually processed in parallel.

It will be obviously understood that when the printer driver forms the printer control commands (the second phase), even if any compression method is applied, the first and sixth phases are not influenced. However, the reason why the second phase is not influenced is because the compressing process itself is executed before the final data compression method which is applied to the printer control commands is determined as a prerequisite.

That is, it is presumed that the data compressing process is always performed irrespective of, for example, a discrimination result about whether the compression method A is applied to the printer control commands or not.

In the third phase, almost of the processing time is expended for Read-Write to the temporary file which is formed on the external memory 11 of the host computer 3000. In the fourth phase, almost of the processing time is expended for the data communication between the host computer 3000 and printer 1500. Consequently, the processing times of those phases are obviously largely influenced by the data size of the printer control command.

In the embodiment, it is also presumed that the processing time that is required for the fifth phase also largely depends on the data size for every compression method applied to the printer control commands from a viewpoint of the hardware or software specifications of the printer 1500.

In the embodiment, specifically, it is assumed that the processing times which are required for the third and fourth phases can be almost calculated by the following calculating equations and that the processing time which is required for the fifth phase can be almost calculated by the following calculating equations (1) to (5) divisionally in the case where the compression method A is applied and the case where it is not applied.

All of $\alpha$, $\beta$, $\gamma 1$, and $\gamma 2$ (which can become a part or all of the feature information which can presume various print processing times when a specific compression method is applied to the printer control commands) in the following equations denote constant values. It is assumed that γ1 denotes the constant value in the case where the compression method A is applied and γ2 denotes a constant value in the case where the data compression is not applied. "Size" indicates a data size of the printer control command.

The processing time (msec) at the third phase $$=\alpha(msec/byte)*Size(byte) \quad (1)$$

The processing time (msec) at the fourth phase $$=\beta(msec/byte)*Size(byte) \quad (2)$$

The processing time (msec) at the fifth phase $$=\gamma1(msec/byte)*Size(byte) =\gamma2(msec/byte)*Size(byte) \quad (3)$$

Therefore, the processing times which are required for the third to fifth phases can be shown as follows divisionally in the case where the compression method A is applied to the printer control commands which are formed and the case where it is not applied. "Size1" denotes a data size in the case where the compression method A is applied and "Size2" denotes a data size in the case where the compression method A is not applied.

The processing time (msec) when the compression method A is applied $$=(\alpha+\beta+\gamma1)(msec/byte)*Size1[byte] \quad (4)$$

The processing time (msec) when the compression is not performed $$=(\alpha+\beta+\gamma2)(msec/byte)*Size2[byte] \quad (5)$$

Thus, in order to execute each of the series of printing processes shown by the third to fifth phases at a higher speed, it will be understood that it is necessary to apply the compression method A when the data size (Size1) in the case where the compression method A is applied is smaller than a value TT shown in the following equation (6) and not to apply the data compression in the other cases.

$$TT=((\alpha+\beta+\gamma2)/(\alpha+\beta+\gamma1))*Size2 \quad (6)$$

A characteristic construction of the embodiment will now be described hereinbelow with reference to FIG. 1.

The embodiment relates to a data processing apparatus (host computer 3000) which is constructed as mentioned above and can communicate with a printer (printer 1500) through a predetermined communication medium, comprising: printer command forming means for constructing a print image by analyzing a drawing command which is formed by the operating system and forming a printer control command which is based on the print image and should be transferred to the printer (the CPU 1 executes a program which is stored in the ROM 3 or external memory 11 and forms and controls); obtaining means for obtaining feature information to presume print processing times by the printer command forming means in the case where a specific compression method is used and the case where it is not used (the CPU 1 obtains the feature information by executing a program which is stored in the ROM 3 or external memory 11); discriminating means for discriminating whether the printer command forming means should use the specific compression method or not on the basis of the feature information obtained by the obtaining means (the CPU 1 executes the program which is stored in the ROM 3 or external memory 11 and forms and controls); and control means for switching and controlling the formation of the printer control command to which the specific compression method is applied by the printer command forming means and the formation of the printer control command to which the specific compression method is not applied on the basis of a discrimination result of the discriminating means (the CPU 1 executes the program which is stored into the ROM 3 or external memory 11 and switches and controls). Therefore, whether the compression method is applied to the print data amount which fluctuates or not can be dynamically determined in consideration of the feature information to presume the print processing time by the printer command forming means. For the print data such that the processing time that is predicted is below the effect which is obtained by the compression, the printer control command which is based on the print image and should be transferred to the printer is formed without actively compressing, and a series of printing processes can be remarkably reduced.

The discriminating means compares the processing times which are computed from the feature information obtained by the first obtaining means and from a predetermined parameter, thereby discriminating whether the printer command forming means can apply the use of the specific compression method or not. Therefore, the print processing times in the case where the compression method is applied and the case where it is not applied are computed and relatively compared and verified, so that whether the use of the specific compression method can be applied or not can be certainly determined.

Further, the discriminating means discriminates whether the specific compression method should be used after the print image was constructed or not. Therefore, the time that is required from a time point after whether the compression method is applied or not was determined to a time point when the printer control command is formed and transferred can be remarkably reduced.

The first obtaining means obtains the feature information to presume the print processing time from a predetermined memory medium. Therefore, the feature information that is peculiar to the specific compression method can be certainly obtained.

Further, the predetermined memory medium is a memory medium (FD as an external memory 11) which is detachable to/from a main body of the data processing apparatus. Therefore, even when the printer is changed or a plurality of printers can be selected, the feature information that is peculiar to the corresponding specific compression method can be certainly obtained.

The first obtaining means obtains the feature information to presume the print processing time from a value that is inputted on a predetermined print setting picture plane depending on a print control module. Therefore, the feature information can be also usually set through a graphical user interface such as a printer driver setting picture plane or the like by the user.

Further, the obtaining means obtains the feature information to presume the print processing time by a predetermined program module. Therefore, an environment to perform the obtaining process of the feature information can be prepared independently of the printer control.

The first obtaining means obtains the feature information to presume the print processing time from a memory resource (ROM 13, external memory 14, or RAM 19) of the printer (printer 1500) through the communication medium. Therefore, the feature information that is peculiar to the specific compression method can be obtained from the printer and a burden on the memory can be reduced.

Further, the first obtaining means obtains the feature information to presume the print processing time from a memory resource (FD as an external memory 14) which is detachable to/from the printer through the communication medium. Therefore, the feature information that is peculiar to the specific compression method can be obtained from the memory resource that is supplied to the printer and a burden on the memory can be reduced.

Further, the data processing apparatus further has: second obtaining means for obtaining print resource information (memory size or the like) from the printer through the communication medium (the CPU 1 obtains it by executing the program which is stored into the ROM 3 or external memory 11); and changing means for changing the feature information to presume the print processing time obtained by the first obtaining means on the basis of the print resource information obtained by the second obtaining means. Therefore, in the case where the resource environment on the printer side fluctuates and the print processing time fluctuates, the feature information that is peculiar to the specific compression method can be changed also in consideration of such a fluctuation. Whether the compression method should be applied or not can be also determined flexibly in correspondence to the fluctuation of the resource information on the printer side.

Processes of the printer driver to which the data processing method of the data processing apparatus according to the invention is applied will now be described in detail hereinbelow.

Figure 5:
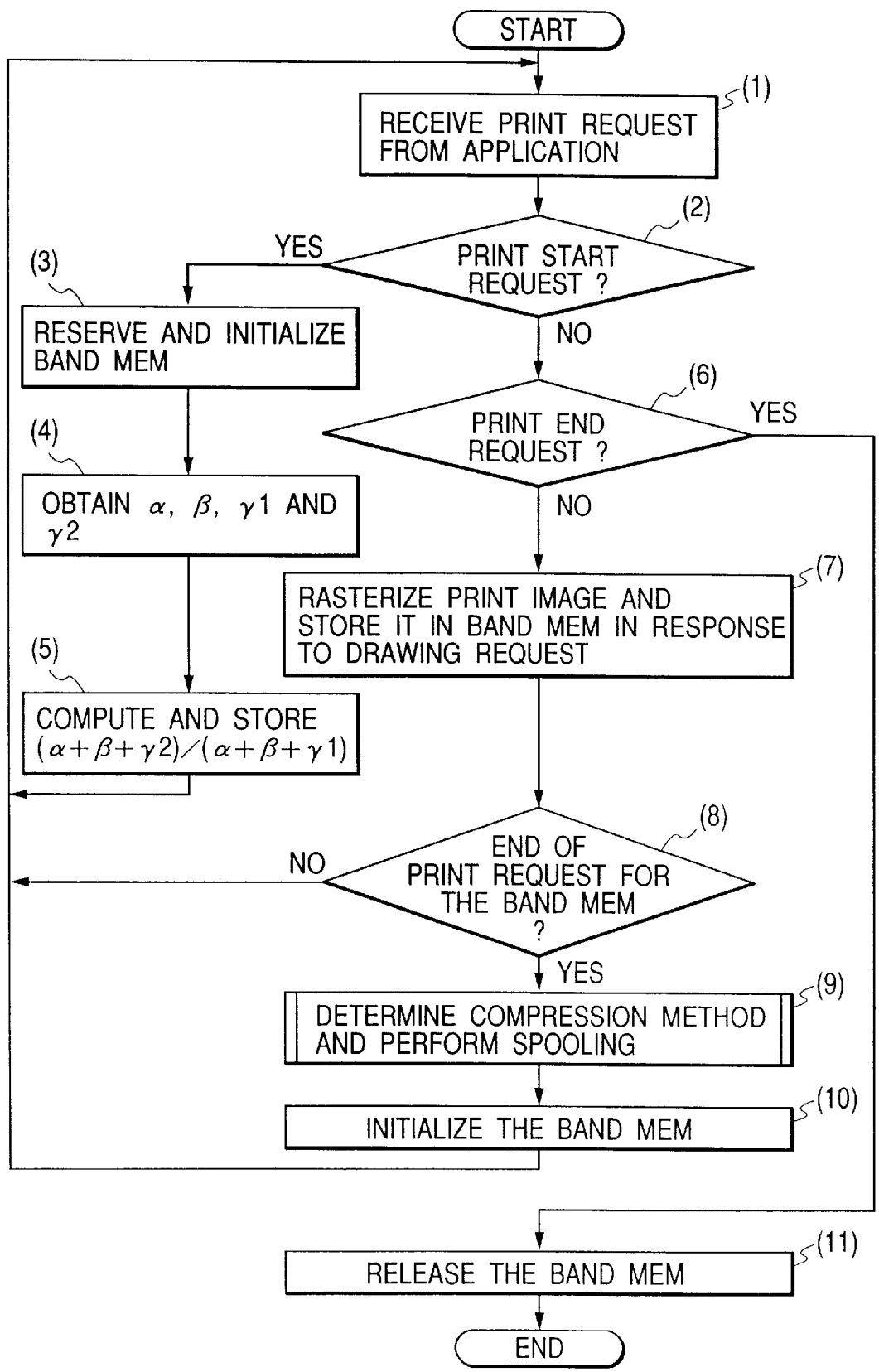
FIG. 5 is a flowchart showing an example of a second data processing procedure in the print control apparatus according to the invention.

FIG. 5 is a flowchart showing an example of a second data processing procedure in the data processing apparatus according to the invention. Reference numerals (1) to (11) denote processing steps.

First, the printer driver receives a print request from the application (1). Subsequently, a check is made to see if the print request denotes the start of printing (2). If it is decided that it means the start of the printing, a memory area (hereinafter, referred to as a band memory) to store the rasterized print image is assured on the RAM 2 of the host computer 3000 and the initialization is performed in step (3). The printer driver again receives the print request from the application.

In step (4), the constants $\alpha$, $\beta$, $\gamma 1$, and $\gamma 2$ which enable the various print processing times in the case where the compression method A is applied and the case where it is not applied to be presumed are read out from the printer driver constructing file stored in the external memory 11 of the host computer 3000 (read out from the printer driver constructing file stored in the RAM 2) and are stored into the RAM 2, respectively.

In step (5), the printer driver calculates a ratio $((\alpha+\beta+\gamma 2)/(\alpha+\beta+\gamma 1))$ shown in the equation (6) and stores into the RAM 2. The processing routine is returned to step (1).

In the embodiment, although it is assumed that the various constants ($\alpha$, $\beta$, $\gamma 1$, and $\gamma 2$) have been prepared and statistically stored in the external memory 11, the invention is not limited to this case. For example, a part or all of the constants. can be stored in the external memory 14 (for instance, FD) which is detachable to/from the host computer 3000 and can be also dynamically stored through a user interface or the like of the printer driver. Further, they can be statistically or dynamically stored into the memory means of the printer 1500 and the printer driver can also get them through a bidirectional interface or a network. Various constants can be also obtained by different means, respectively.

When it is determined in step (2) that the print request received from the application does not indicate the start of the printing, a check is subsequently made to see if it denotes the end of printing (6). When it is decided that the print request does not indicate the end of the printing, only when it is the drawing request, the print image according to the requested contents is constructed (rasterized) and stored into the band memory which is assured on the RAM 19 (7).

In step (8), a check is made to see if the print request from the application for the band area which is being processed has been finished. If NO, the processing routine is returned to step (1) and similar processes are repeated.

When it is determined in step (8) that the print request from the application has been finished, namely, when it is decided that the print request for the band area which is being processed has been finished, the processing routine advances to step (9). The band area is divided into segments of a proper size. The printer control command corresponding to each of the divided segments is formed while dynamically applying the data compression as necessary. The decision of the compression method and the spool processing routine will be described hereinlater with reference to FIG. 6.

In step (10), the band memory is initialized. The processing routine is returned to step (1) in order to start to again receive the print request corresponding to a new band area from the application.

When it is determined in step (6) that the print request received from the application denotes the end of the printing, step (11) follows and the band memory is released from the RAM 2. The processes are finished.

Figure 6:
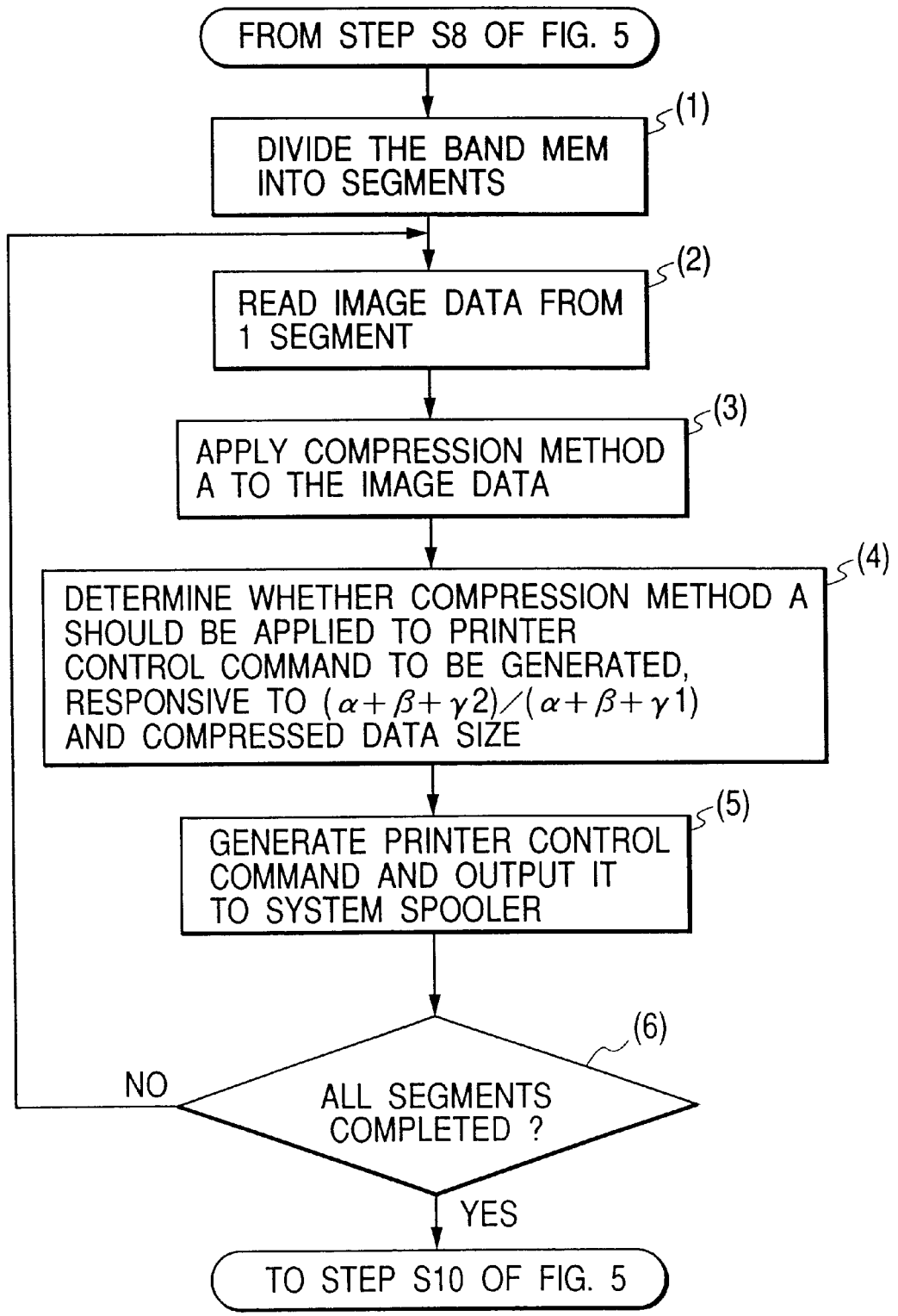
FIG. 6 is a flowchart showing an example of a third data processing procedure in the print control apparatus according to the invention.

FIG. 6 is a flowchart showing an example of a third data processing procedure in the data processing apparatus according to the invention and corresponds to a detailed procedure of the decision of the compression method and spool processing routine in step (9) shown in FIG. 5. Reference numerals (1) to (6) denote processing steps.

As already mentioned, when it is determined in step (8) shown in FIG. 5 that the print request from the application to the band area which is being processed has been finished, the printer driver sequentially forms the printer control commands corresponding to the print image corresponding to the band area.

First, the printer driver divides the band area into segments of a proper size (1). The image data corresponding to each of the divided segments is read out from the RAM 2 in accordance with a specific order (2). The compression method A is applied to the read-out data and the compression data is stored into the RAM 2 (3).

The printer driver discriminates whether the image data corresponding to the divided segment which is being processed has been compressed by the compression method A at a ratio over the ratio $((\alpha+\beta+\gamma 2)/(\alpha+\beta+\gamma 1))$ stored in step (5) or not, thereby deciding whether the compression method A is applied to the printer control command to be formed or not (4).

That is, now assuming that the image data size in the non-compression state is equal to Size2, if the data size Size1 after completion of the compression is smaller than the calculation result shown in the equation (6), the compression method A is applied to the printer control command. On the contrary, when it is larger, the data compression is not applied to the printer control command.

Subsequently, the printer driver forms the printer control command on the basis of the compression method decided in step (4) and outputs it to a system spooler which is managed by the OS (5). A check is now made to see if all of the processes for the divided segments have been finished (6). If NO, the processing routine is returned to step (2). If YES, the processing routine advances to step (10) and subsequent shown in FIG. 5.

According to the embodiment, the printer driver to which the processing procedure is applied obtains the feature which enables the various print processing times in the case where the compression method is applied and the case where it is not applied to be presumed and can sequentially form the printer control commands while the compression method by which the relatively high-speed process can be performed is dynamically determined on the basis of the feature. Thus, there is an effect such that the relatively high-speed printing process can be realized.

In the embodiment, the invention has been applied by paying attention to, particularly, the printer control command corresponding to the function to draw a raster image. However, the invention can be also similarly applied to the other printer control commands so long as they support the compression and non-compression.

Further, in the case where the printer supports a plurality of compression methods for the printer control command corresponding to the raster image drawing function, the printer control command can be also formed while dynamically switching a plurality of compression methods.

The functions shown in the embodiment can be also executed by the host computer on the basis of a program which is installed from the outside. In such a case, the invention is also applied to a case where by loading an information group including a program into an output apparatus or a system including the host computer from a memory medium such as CD-ROM, flash memory, FD, or the like or from an external memory medium through a network such as electronic mail, personal computer communication, or the like, such a function is supplied to the host computer or output apparatus.

[Second Embodiment]

The above first embodiment has been described with respect to the case of determining whether the compression method A is performed or not by the equation (6) on the assumption that the memory size of the RAM 19 on the printer 1500 side is constant as a prerequisite. However, it is also possible to construct in a manner such that the printer driver which has been loaded into the RAM 2 of the host computer 3000 and is operating thereon obtains the hardware environment of the printer 1500 through the bidirectional interface, network, or the like and changes the feature information to enable the specific print processing time to be presumed in accordance with the environment. Such an embodiment will now be described hereinbelow.

In the embodiment, it is assumed that the constant values ($\gamma 1$, $\gamma 2$) as feature information which enables the processing time that is required for phase 5 (development of the printer control command in the printer) shown in the first embodiment to be presumed change depending on a size of RAM 19 provided for the printer 1500 and their details are as shown in FIG. 7.

FIG. 7 is a diagram showing an example of a feature information resource table which is assured in the RAM 2 shown in FIG. 1. For instance, this table is obtained from the printer 1500 by communication and is formed.

In the diagram, $\gamma 1$ and $\gamma 2$ denote the constant values which change respectively in dependence on the size of RAM 19 provided for the printer 1500. As the size of RAM 19 increases (including the case where the memory is expanded), its value decreases, so that the processing time eventually becomes short.

Data processes regarding the data processing apparatus according to the invention will be further described hereinbelow with reference to a flowchart shown in FIG. 8.

Figure 8:
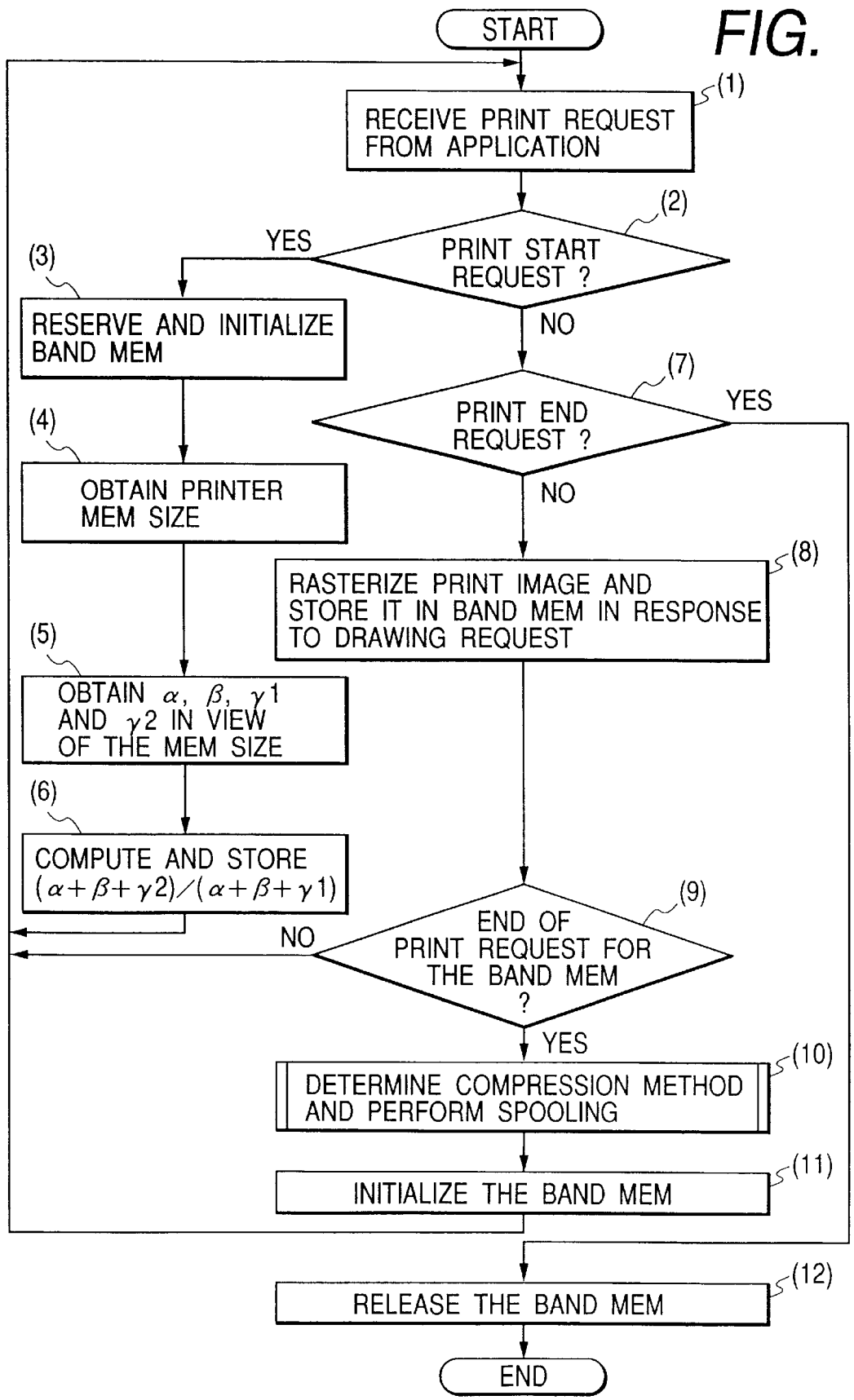
FIG. 8 is a flowchart showing an example of a fourth data processing procedure in the print control apparatus according to the invention.

FIG. 8 is a flowchart showing an example of a fourth data processing procedure in the data processing apparatus according to the invention. Reference numerals (1) to (12) denote processing steps.

First, the printer driver receives a print request from the application (1). Subsequently, a check is made to see if the print request denotes the start of printing (2). If it is decided that it means the start of the printing, a memory area (hereinafter, referred to as a band memory) to store the rasterized print image is assured on the RAM 2 of the host computer 3000 and the initialization is performed in step (3). The printer driver again receives the print request from the application. When the print request indicative of the start of printing is received, the printer driver obtains the size of RAM 19 provided for the printer 1500 through the bidirectional interface 21 in step (4). In step (5), the printer driver reads out the constants $\gamma 1$ and $\gamma 2$ which enable the processing time that is required for phase 5 to be presumed and reads out the constants a and a which enable the processing times at the third and fourth phases to be presumed from the external memory 11 of the host computer 3000 on the basis of the size obtained in step (4) and stores them into the RAM 2 (6), respectively.

In step (6), the printer driver calculates the ratio (($\alpha+\beta+\gamma 2$)/($\alpha+\beta+\gamma 1$)) shown in the equation (6) and stores into the RAM 2. The processing routine is returned to step (1).

When it is determined in step (2) that the print request received from the application does not indicate the start of the printing, a check is subsequently made to see if it denotes the end of printing (7). When it is decided that the print request does not indicate the end of the printing, only when it is the drawing request, the print image corresponding to the requested contents is constructed (rasterized) and stored into the band memory which is assured in the RAM 19 (8).

In step (9), a check is made to see if the print request from the application for the band area which is being processed has been finished. If NO, the processing routine is returned to step (1) and similar processes are repeated.

When it is determined in step (9) that the print request from the application has been finished, namely, when it is determined that the print request for the band area which is being processed has been finished, step (10) follows. The band area is divided into segments of a proper size and the printer control command corresponding to each of the divided segments is formed while dynamically applying the data compression as necessary. The process in step (10) is as mentioned above in conjunction with FIG. 6. The return destination of FIG. 6 in this case is step (11) shown in FIG. 8.

In step (11), subsequently, the band memory is initialized. The processing routine is returned to step (1) in order to start to again receive the print request corresponding to a new band area from the application.

When it is determined in step (7) that the print request received from the application denotes the end of the printing, step (12) follows and the band memory is released from the RAM 2. The processes are finished.

According to the embodiment, even when the development processing time of the printer control command in the printer is the time which changes due to the size of RAM provided for the printer, the feature information which enables the various print processing times in the case where the compression method is applied and the case where it is not applied to be presumed is obtained on the basis of the size of RAM. The printer control commands can be sequentially formed while the compression method by which the relatively high-speed process can be performed is dynamically determined on the basis of the feature information. There is, consequently, an effect such that the relatively high-speed printing process can be always realized without depending on the size of RAM provided in the printer.

A characteristic construction of the embodiment will now be described hereinbelow with reference to FIG. 8 and the like.

The embodiment relates to a data processing method of a data processing apparatus which is constructed as mentioned above and can communicate with a printer through a predetermined communication medium or relates to a memory medium in which a computer readable program for controlling a data processing apparatus which can communicate with a printer through a predetermined communication medium has been stored, wherein the data processing method or the program comprises: a printer command forming step (step (10) in FIG. 8) of constructing a print image by analyzing a drawing command which is formed by an operating system and forming a printer control command which is based on the print image and should be transferred to the printer; an obtaining step step (5) in FIG. 8) of obtaining feature information to presume print processing times by the printer command forming step in the case where a specific compression method is used and the case where it is not used; a discriminating step (step (4) in FIG. 6) of discriminating whether the specific compression method should be used in the printer command forming step or not on the basis of the feature information obtained by the obtaining step; and a deciding step (step (10) in FIG. 8) of deciding the formation of the printer control command to which the specific compression method which is formed by the printer command forming step is applied and the formation of the printer control command to which the specific compression method is not applied on the basis of a discrimination result of the discriminating step. Therefore, whether the compression method is applied to the print data amount which fluctuates or not can be dynamically determined in consideration of the feature information to presume the print processing time by the printer command forming step. For the print data such that the processing time which is presumed is below the effect which is obtained by the compression, the printer control command which is based on the print image and should be transferred to the printer is formed without actively compressing. A series of printing processes can be remarkably reduced.

A construction of data processing programs which can be read out by a printing system to which the print control apparatus according to the invention can be applied will now be described hereinbelow with reference to a memory map shown in FIG. 9.

FIG. 9 is a diagram for explaining the memory map of a memory medium to store various data processing programs which can be read out by the printing system to which the print control apparatus according to the invention can be applied.

Although not particularly shown, there is also a case where information to manage the programs which are stored in the memory medium, for example, version information, names of the persons who made the programs, and the like are also stored, and information depending on the OS or the like on the program reading side, for example, icons to identify and display the programs and the like are also stored.

Further, data depending on the various programs is also managed in the above directory. There is also a case where a program to install the various programs into the computer, a program to decompress a program in the case where the program to install has been compressed, and the like are also stored.

The functions shown in FIGS. 4, 5, 6, and 8 in the embodiments can be also executed by the host computer on the basis of a program which is installed from the outside. In such a case, the invention is also applied to a case where an information group including the programs are supplied to an output apparatus by a memory medium such as CD-ROM, flash memory, FD, or the like or from an external memory medium through a network.

It will be obviously understood that the object of the invention is accomplished by a construction such that a memory medium in which program codes of software to realize the functions of the foregoing embodiments as mentioned above have been recorded is supplied to a system or an apparatus and a computer (or CPU or MPU) of the system or apparatus reads out and executes the program codes stored in the memory medium.

In this case, the program codes themselves read out from the memory medium realize the novel function of the invention and the memory medium in which the program codes have been stored constructs the invention.

As a memory medium to supply the program codes, for example, any one of a floppy disk, a hard disk, an optical disk, a magnetooptic disk, a CD-ROM, a CD-R, a magnetic tape, a non-volatile memory card, an ROM, an EEPROM, and the like can be used.

It will be obviously understood that the invention incorporates not only a case where the functions of the foregoing embodiments are realized by executing the read-out program codes by the computer but also a case where the OS (operating system) or the like which is operating on the computer executes a part or all of the actual processes on the basis of instructions of the program codes and the functions of the foregoing embodiments are realized by those processes.

Further, it will be obviously understood that the invention also incorporates a case where the program codes read out from the memory medium are written into a memory provided for a function expanding board inserted to a computer or a function expanding unit connected to the computer and, after that, a CPU or the like provided for the function expanding board or function expanding unit executes a part or all of the actual processes on the basis of instructions of the program codes, and the functions of the foregoing embodiments are realized by the processes.

As described above, according to the first aspect of the invention, there is provided a data processing apparatus which can communicate with a printer through a predetermined communication medium, comprising: printer command forming means for constructing a print image by analyzing a drawing command which is formed by an operating system and for forming a printer control command which is based on the print image and should be transferred to the printer; first obtaining means for obtaining feature information to presume print processing times by the printer command forming means in the case where a specific compression method is used and the case where it is not used; discriminating means for discriminating whether the printer command forming means should use the specific compression method or not on the basis of the feature information obtained by the first obtaining means; and control means for switching and controlling the formation of the printer control command to which the specific compression method which is formed by the printer command forming means is applied and the formation of the printer control command to which the specific compression method is not applied on the basis of a discrimination result of the discriminating means. Therefore, whether the compression method is applied to the print data amount which fluctuates or not can be dynamically determined in consideration of the feature information to presume the print processing time by the printer command forming means. For the print data such that the processing time that is predicted is below the effect which is obtained by the compression, the printer control command which is based on the print image and should be transferred to the printer is formed without actively compressing, and a series of printing processes can be remarkably reduced.

According to the second aspect of the invention, the discriminating means compares the processing times which are computed from the feature information obtained by the first obtaining means and from a predetermined parameter, thereby discriminating whether the printer command forming means can apply the use of the specific compression method or not. Therefore, the print processing times in the case where the compression method is applied and the case where it is not applied are computed and relatively compared and verified, so that whether the use of the specific compression method can be applied or not can be certainly determined.

According to the third aspect of the invention, the discriminating means discriminates whether the specific compression method should be used after the print image was constructed or not. Therefore, the time that is required from a time point after whether the compression method is applied or not was determined to a time point when the printer control command is formed and transferred can be remarkably reduced.

According to the fourth aspect of the invention, the first obtaining means obtains the feature information to presume the print processing time from a predetermined memory medium. Therefore, the feature information that is peculiar to the specific compression method can be certainly obtained.

According to the fifth aspect of the invention, the predetermined memory medium is a memory medium which is detachable to/from a main body of the data processing apparatus. Therefore, even when the printer is changed or a plurality of printers can be selected, the feature information that is peculiar to the corresponding specific compression method can be certainly obtained.

According to the sixth aspect of the invention, the first obtaining means obtains the feature information to presume the print processing time from a value that is inputted on a predetermined print setting picture plane depending on a print control module. Therefore, the feature information can be also usually set through a graphical user interface such as a printer driver setting picture plane or the like by the user.

According to the seventh aspect of the invention, the first obtaining means obtains the feature information to presume the print processing time by a predetermined program module. Therefore, an environment to perform the obtaining process of the feature information can be prepared independently of the printer control.

According to the eighth aspect of the invention, the first obtaining means obtains the feature information to presume the print processing time from a memory resource of the printer through the communication medium. Therefore, the feature information that is peculiar to the specific compression method can be obtained from the printer and a burden on the memory can be reduced.

According to the ninth aspect of the invention, the first obtaining means obtains the feature information to presume the print processing time from a memory resource which is detachable to/from the printer through the communication medium. Therefore, the feature information that is peculiar to the specific compression method can be obtained from the memory resource that is supplied to the printer and a burden on the memory can be reduced.

According to the tenth aspect of the invention, the data processing apparatus further has: second obtaining means for obtaining print resource information from the printer through the communication medium; and changing means for changing the feature information to presume the print processing time obtained by the first obtaining means on the basis of the print resource information obtained by the second obtaining means. Therefore, in the case where the resource environment on the printer side fluctuates and the print processing time fluctuates, the feature information that is peculiar to the specific compression method can be changed also in consideration of such a fluctuation. The use of the compression method can be determined flexibly also in correspondence to the fluctuation of the resource information on the printer side.

According to the eleventh and twelfth aspects of the invention, there is provided a data processing method of a data processing apparatus which is constructed as mentioned above and can communicate with a printer through a predetermined communication medium or a memory medium in which a computer readable program for controlling a data processing apparatus which can communicate with a printer through a predetermined communication medium has been stored, wherein the data processing method or the program comprises: a printer command forming step of constructing a print image by analyzing a drawing command which is formed by an operating system and forming a printer control command which is based on the print image and should be transferred to the printer; an obtaining step of obtaining feature information to presume print processing times by the printer command forming step in the case where a specific compression method is used and the case where it is not used; a discriminating step of discriminating whether the specific compression method should be used in the printer command forming step or not on the basis of the feature information obtained by the obtaining step; and a deciding step of deciding the formation of the printer control command to which the specific compression method which is formed by the printer command forming step is applied and the formation of the printer control command to which the specific compression method is not applied on the basis of a discrimination result of the discriminating step. Therefore, whether the compression method is applied to the print data amount which fluctuates or not can be dynamically determined in consideration of the feature information to presume the print processing time by the printer command forming step. For the print data such that the processing time which is presumed is below the effect which is obtained by the compression, the printer control command which is based on the print image and should be transferred to the printer is formed without actively compressing. A series of printing processes can be remarkably reduced.

Therefore, the feature information which enables the various print processing times in the case where the specific compression method is applied and the case where it is not applied to be presumed is obtained. The printer control commands can be sequentially formed while the compression method by which the relatively high-speed process can be performed is dynamically determined on the basis of the feature information. Effects such that the relatively high-speed printing process can be realized and the like are obtained.

What is claimed is:

1. A data processing apparatus which can execute image processing in units of a predetermined segment and can communicate with a printer through a predetermined communication medium, said apparatus comprising:

print command forming means for producing a print image by analyzing a drawing command and forming, based on the print image, a print control command to be transmitted to the printer;

compression means for compressing image data in a predetermined segment into compressed data by applying a specific compression method so as to obtain size information indicating a size of the compressed data;

discrimination means for making a discrimination, based on the size information obtained by said compression means, as to whether the specific compression method is to be applied to the image data in the predetermined segment; and control means for controlling said print command forming means to form the print control command that is related to the specific compression method if said discrimination means makes a discrimination that the specific compression method is to be applied to the image data in the predetermined segment, wherein said discrimination means repeatedly makes the discrimination for every predetermined segment; and wherein said control means controls said print command forming means to form the print control command that is related to the specific compression method if the size information obtained by said compression means indicates the size of the compressed data to be smaller than a value obtained by multiplying a size of the image data in the predetermined segment by a predetermined ratio, and said control means controls said print command forming means not to form the print control command that is related to the specific compression method if the obtained size information does not indicate the size of the compressed data to be smaller than that value.

2. An apparatus according to claim 1, wherein said discrimination means makes a discrimination that the specific compression method is to be applied to the image data in the predetermined segment if the size information obtained by said compression means indicates the size of the compressed data to be smaller than a value obtained by multiplying a size of the image data in the predetermined segment by a predetermined ratio.

3. An apparatus according to claim 1, further comprising obtaining means for obtaining feature information including original size information indicating a size of the image data in the predetermined segment and the size information indicating the size of the compressed data, wherein said discrimination means makes the discrimination based on the feature information obtained by said obtaining means.

4. An apparatus according to claim 1, wherein the predetermined segment is one of plural segments into which a band is divided.

5. A method of controlling a data processing apparatus which can execute image processing in units of a predetermined segment and can communicate with a printer through a predetermined communication medium, said method comprising:

a print command forming step, of producing a print image by analyzing a drawing command and forming, based on the print image, a print control command to be transmitted to the printer;

a compression step, of compressing image data in a predetermined segment into compressed data by applying a specific compression method so as to obtain size information indicating a size of the compressed data;

a discrimination step, of making a discrimination, based on the obtained size information, as to whether the specific compression method is to be applied to the image data in the predetermined segment; and a control step, of controlling execution of said print command forming step to form the print control command that is related to the specific compression method if it is discriminated, in said discrimination step, that the specific compression method is to be applied to the image data in the predetermined segment, wherein said discrimination step repeatedly makes the discrimination for every predetermined segment; and wherein said control step controls execution of said print command forming step to form the print control command that is related to the specific compression method if the obtained size information indicates the size of the compressed data to be smaller than a value obtained by multiplying a size of the image data in the predetermined segment by a predetermined ratio, and said control step controls said print command forming step not to form the print control command that is related to the specific compression method if the obtained size information does not indicate the size of the compressed data to be smaller than that value.

6. A method according to claim 5, wherein said discrimination step makes a discrimination that the specific compression method is to be applied to the image data in the predetermined segment if the obtained size information indicates the size of the compressed data smaller than a value obtained by multiplying a size of the image data in the predetermined segment by a predetermined ratio.

7. A method according to claim 5, further comprising an obtaining step, of obtaining feature information including original size information indicating a size of the image data in the predetermined segment and the size information indicating the size of the compressed data, wherein said discrimination step makes the discrimination based on the obtained feature information.

8. A method according to claim 5, wherein the predetermined segment is one of plural segments into which a band is divided.

9. A computer program for controlling a data processing apparatus which can execute image processing in units of a predetermined segment and can communicate with a printer through a predetermined communication medium, said program comprising:

a print command forming step, of producing a print image by analyzing a drawing command and forming, based on the print image, a print control command to be transmitted to the printer;

a compression step, of compressing image data in a predetermined segment into compressed data by applying a specific compression method so as to obtain size information indicating a size of the compressed data;

a discrimination step, of making a discrimination, based on the obtained size information, as to whether the specific compression method is to be applied to the image data in the predetermined segment; and a control step, of controlling execution of said print command forming step to form the print control command that is related to the specific compression method if it is discriminated, in said discrimination step, that the specific compression method is to be applied to the image data in the predetermined segment, wherein said discrimination step repeatedly makes the discrimination for every predetermined segment; and wherein said control step controls execution of said print command forming step to form the print control command that is related to the specific compression method if the obtained size information indicates the size of the compressed data to be smaller than a value obtained by multiplying a size of the image data in the predetermined segment by a predetermined ratio, and said control step controls execution of said print command forming step not to form the print control command that is related to the specific compression method if the obtained size information does not indicate the size of the compressed data to be smaller than that value.

10. A program according to claim 9, wherein said discrimination step makes a discrimination that the specific compression method is to be applied to the image data in the predetermined segment if the obtained size information indicates the size of the compressed data smaller than a value obtained by multiplying a size of the image data in the predetermined segment by a predetermined ratio.

11. A program according to claim 9, further comprising an obtaining step, of obtaining feature information including original size information indicating a size of the image data in the predetermined segment and the size information indicating the size of the compressed data, wherein said discrimination step makes the discrimination based on the obtained feature information.

12. A program according to claim 9, wherein the predetermined segment is one of plural segments into which a band is divided.

13. A data processing apparatus which can execute image processing in units of a predetermined segment and can communicate with a printer through a predetermined communication medium, said apparatus comprising:

a print command forming unit adapted to produce a print image by analyzing a drawing command and to form, based on the print image, a print control command to be transmitted to the printer;

a compression unit adapted to compress image data in a predetermined segment into compressed data by applying a specific compression method so as to obtain size information indicating a size of the compressed data;

a discrimination unit adapted to make a discrimination, based on the size information obtained by said compression unit, as to whether the specific compression method is to be applied to the image data in the predetermined segment; and a control unit adapted to control said print command forming unit to form the print control command that is related to the specific compression method if said discrimination unit makes a discrimination that the specific compression method is to be applied to the image data in the predetermined segment, wherein said discrimination unit repeatedly makes the discrimination for every predetermined segment; and wherein said control unit controls said print command forming unit to form the print control command that is related to the specific compression method if the size information obtained by said compression unit indicates the size of the compressed data to be smaller than a value obtained by multiplying a size of the image data in the predetermined segment by a predetermined ratio, and said control unit controls said print command forming unit not to form the print control command that is related to the specific compression method if the obtained size information does not indicate the size of the compressed data to be smaller than that value.

* * * * *

UNITED STATES PATENT AND TRADEMARK OFFICE
CERTIFICATE OF CORRECTION

PATENT NO. : 6,535,292 B1
DATED : March 18, 2003
INVENTOR(S) : Yoshinobu Kuroi

It is certified that error appears in the above-identified patent and that said Letters Patent is hereby corrected as shown below:

Column 8,
Lines 45 and 48, "almost of" should read -- most of --; and

Column 11,
Line 57, "constants." should read -- constants --.

Column 14,
Line 17, "a and a" should read -- $\alpha$ and $\beta$ --.

Column 15,
Line 19, "step step" should read -- step (step --.

Signed and Sealed this

Eighteenth Day of November, 2003

JAMES E. ROGAN
*Director of the United States Patent and Trademark Office*